(12) United States Patent
Levithan

(10) Patent No.: US 10,225,351 B2
(45) Date of Patent: Mar. 5, 2019

(54) INTERSESSION COMMUNICATIONS

(71) Applicant: Facebook, Inc., Menlo Park, CA (US)

(72) Inventor: Steven Harold Levithan, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 427 days.

(21) Appl. No.: 14/967,762

(22) Filed: Dec. 14, 2015

(65) Prior Publication Data

US 2017/0171318 A1    Jun. 15, 2017

(51) Int. Cl.
*G06F 15/173* (2006.01)
*H04L 29/08* (2006.01)
*H04L 12/26* (2006.01)

(52) U.S. Cl.
CPC .......... *H04L 67/14* (2013.01); *H04L 43/106* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 6,601,091 B1* | 7/2003 | Spilo | ................ | G06F 17/30902 707/E17.12 |
| 6,678,791 B1* | 1/2004 | Jacobs | ............... | G06F 17/30902 709/203 |
| 8,819,251 B1* | 8/2014 | Lenz | ................... | H04L 65/1069 370/356 |
| 9,569,356 B1* | 2/2017 | Wei | ...................... | G06F 12/0261 |
| 2007/0214495 A1* | 9/2007 | Royer | ..................... | G06F 21/41 726/2 |
| 2007/0299928 A1* | 12/2007 | Kohli | ..................... | H04L 63/10 709/217 |
| 2014/0081983 A1* | 3/2014 | Smith | ................. | G06F 11/3438 707/741 |
| 2016/0371507 A1* | 12/2016 | Jakobsson | ............... | H04L 63/04 |

* cited by examiner

*Primary Examiner* — Phyllis A Book
(74) *Attorney, Agent, or Firm* — FisherBroyles, LLP

(57) ABSTRACT

A system and method for communication across browser-based applications, and from a crashed application to a web server are disclosed. The system can store structured data in local storage for each instance (e.g., tab, window, frame) of an browser-based application (e.g., website, web application). The data can be structured to group blocks of data according to instances of an application in different tabs. A first session can locate a block of data created by a second session to achieve synchronization between two sessions. In addition, if one session has crashed, data written by that session can be accessed by another session and sent to a web server. In some implementations, a session, when writing to a block of data, can include meta-data for another session or for the web server, such as a timestamp, valid-until time, data-item identifier, etc.

13 Claims, 8 Drawing Sheets

INTERSESSION COMMUNICATIONS

BACKGROUND

Web browsers enable users to access a variety of websites and web applications on the Internet. Users often use web browsers ("browsers") to open several sessions ("sessions,") e.g. any combination of tabs, windows, frames, or panels of websites and web applications ("web apps"). For example, a user can open a social media website, an online retail store, and an instant messaging web application all on the same browser with different tabs. The user can also open several sessions for the same social media website, the online retail store, or the instant messaging web app on the same browser. A user can modify values in the different tabs, close tabs, and re-open tabs.

Although interacting with multiple sessions is convenient, multiple sessions can present problems with data synchronization, reporting to servers, prompting, etc. For example, a user who modifies a value in one session for a web app may find that the same value in another session for the web app is not modified. More specifically, if a user checks a box in a voting poll in a web app, the user may see that the same voting poll in another tab for the web app does not have a checked box. Also, a user may experience a session crashing. For example, a user may be using several tabs for an online retail store website or web app. The user may have selected to purchase one item from one tab and another item from another tab. If one tab crashes, the user will need to re-open a tab and find the item again. In addition, a provider of the web app can prevent future similar crashes if data about the state of the session can be reported, such as a location in a script that was executing, the value in of variables, thread interleavings, etc. As another example, a user engaged in messaging on a social media website or web app can have several windows opens. Each window can display a conversation with the user's contacts. However, if the user responds to a message on one window, the user may not see that response updated on another tab.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
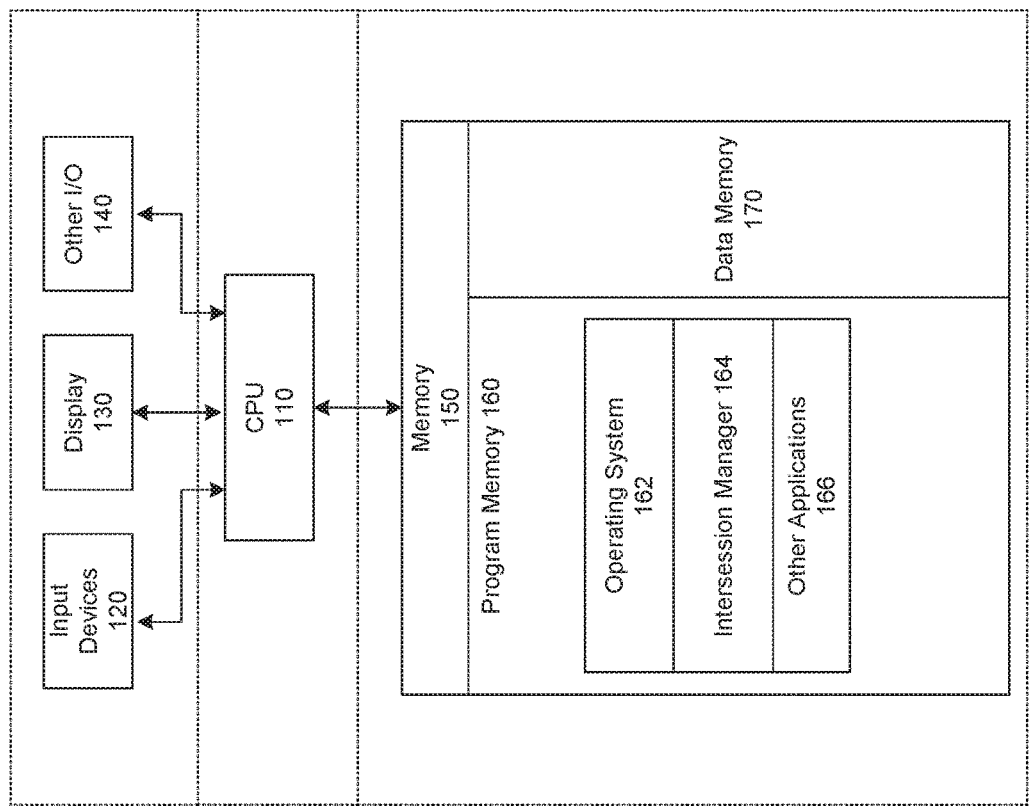
FIG. 1 is a block diagram illustrating an overview of devices on which some implementations can operate.

An intersession communication system that enables multiple sessions in a browser to communicate data across the sessions is disclosed herein. In some implementations, the intersession communication system stores data for each session of a browser in a data structure in local storage and communicates the stored information between sessions. In some implementations, one session can read stored information from local storage for another session. For example, a user can open several tabs of a social media web application and the user can make selections and modifications to one of the tabs. In such an example, the system can store the user's selections and modifications in local storage and another tab of the web app can update itself to show the user's selections and modifications.

In some implementations, the intersession communication system can store data in local storage as structured data for each session. The intersession communication system can locate a first block of data for a first session (e.g., a tab), locate a second block of data for a second session, and synchronize data between the two sessions. In some implementations, the intersession communication system can detect that one session of the application has crashed. In addition, if one session has crashed, the intersession communication system can access data from the crashed session and add it to another session. In some implementations, the intersession communication system can send a crash report to a server, retrieve data from a crashed session, or remove data from local storage for a closed session. In some implementations, the intersession communication system can communicate data between sessions without contacting a server.

In some implementations, the intersession communication system can provide some structured to data in local storage for each instance of a browser-based application with periodic or non-periodic updates. In some implementations, a portion of the intersession communication system can be executed by each session to read and store data to a browser's local storage, for example with timestamps to identify the age of data and expiration identifiers to show whether data is valid for each session. The intersession communication system can synchronize, share, update, reject, or otherwise manipulate data for each session in local storage by having that session periodically poll the session data structures from local storage.

In this disclosure, a "session" is defined as one instance (e.g., tab, window, frame, panel) of an application (e.g., website, web application). For example, a tab of a website can be one session. As another example, a window of a web application can be a session. A user can open several (e.g., two or more) sessions of an application. For example, a user can open eight sessions for a social media web app (e.g. two tabs in each of a first and second window, two individual third and fourth windows, and a fifth window with a page that has loaded two iframes each for the social media website) and all sessions can run on the user's mobile device web browser.

In this disclosure, "local storage" is defined as storage within a browser. For example, local storage can be storage in CHROME, FIREFOX, INTERNET EXPLORER, EDGE, SAFARI, OPERA or other web browsers. In some implementations, local storage can span multiple sessions and last after a session is closed. In some implementations, local storage can be accessed through a call to the window.localStorage or window.sessionStorage objects. In some implementations, local storage can store data as strings. In these cases, objects can be serialized (i.e. converted to a string) for storing in local storage.

In one example, when a user opens several windows of a social media web app and makes changes to one window such as by selecting a photo, a process of the intersession communication system for that window can store the change to local storage. Other processes of the intersession communication system corresponding to other sessions can make changes to all windows reflecting the change by reading data including the change from the local storage of the browser. As another example, if a user opens several tabs of a sports website and makes changes to one tab, such as a voting selection for player of the year, the intersession communication system can prompt the user for whether he or she wants to replace or update the other windows with this selection. Another example implementation of the intersession communication system can be when a user of a mobile device or desktop opens a browser with several tabs of a social media app. The user can add text and make selections (e.g., toggling a button in the web app, change a password) to one tab of the web app, and the intersession communication system can update each session that is open to reflect the new selections without querying a server. The system can poll each tab from local memory and use time stamps to synchronize each tab.

The disclosed system has several advantages. Although several advantages are described in this disclosure, not all advantages are required in each implementation of the system. Also, some advantages will become apparent to those having ordinary skill in the art after reviewing the disclosure. One advantage is that the intersession communication system can operate offline because it can share or synchronize data between different sessions without querying a server. Further, the intersession communication system can be useful for unreliable or slow Internet connections because only one session needs to send and receive data from a web server to gain access to data; the intersession communication system can then use the one session to update the other sessions. Another advantage of the intersession communication system is that it can assist with crash detection and reporting even if the application does not have crash detection procedures. For example, when one session of a web app stops responding (e.g., crashes), the system can use other sessions to detect that one session has stopped running and alert the user or server and provide debugging information. The intersession communication system can then open a new session with recent data from the stopped session. Also, users can experience satisfaction when navigating between sessions of a website or web application because each session will be frequently updated to reflect a user's behavior.

Turning now to the figures, FIG. 1 is a block diagram illustrating an overview of devices on which some implementations of the disclosed technology can operate. The devices can comprise hardware components of a device 100 that performs intersession communication. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; rather a memory is non-transitory. Memory 150 can include program memory 160 that stores programs and software, such as an operating system 162, intersession manager 164, and other application programs 166. Memory 150 can also include data memory 170 that can include user data such as passwords, usernames, input text, audio, video, user preferences, and selections. Data memory 170 can also include configuration data, settings, user options, time stamps, or session identifiers. Data in memory 170 can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, mobile devices, multiprocessor systems, microprocessor-based systems, set-top boxes, programmable consumer electronics, network PCs, minicomputers, mainframe computers, and distributed computing environments that include any of the above systems or devices, or the like.

Figure 2:
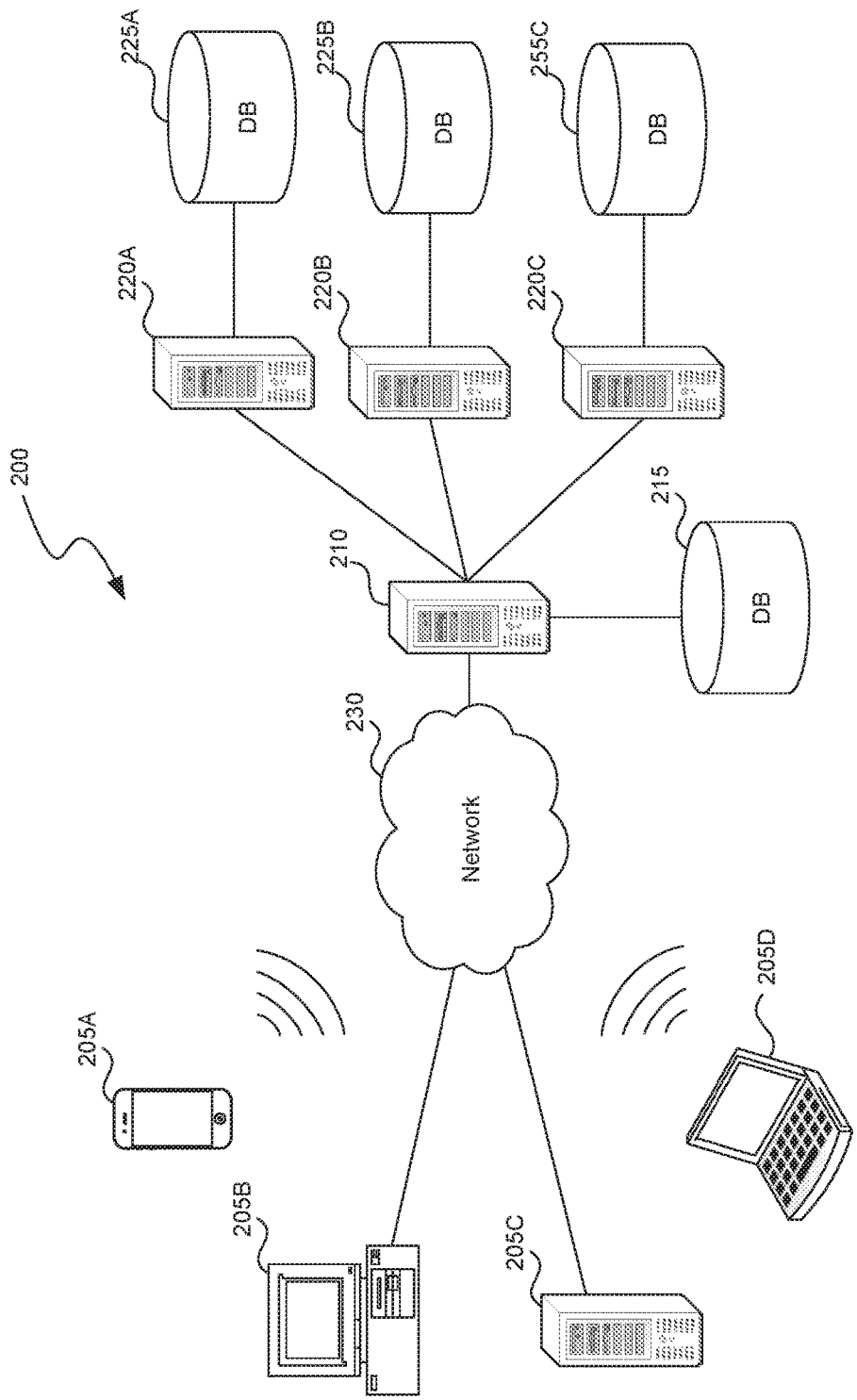
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. In some implementations, servers 220A-C can be web servers or application servers. As discussed above, each server 220 can correspond to a group of servers, and each of these servers can share a database or can have their own database. Databases 215 and 225 can warehouse (e.g. store) information such as users information (e.g., password, username, selections, preferences, photos, videos) and session information (e.g., session identification, time period for a valid session, crash data, polling data). Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. Although the connections between server 210 and servers 220 are shown as separate connections, these connections can be any kind of local, wide area, wired, or wireless network, including network 230 or a separate public or private network.

Figure 3:
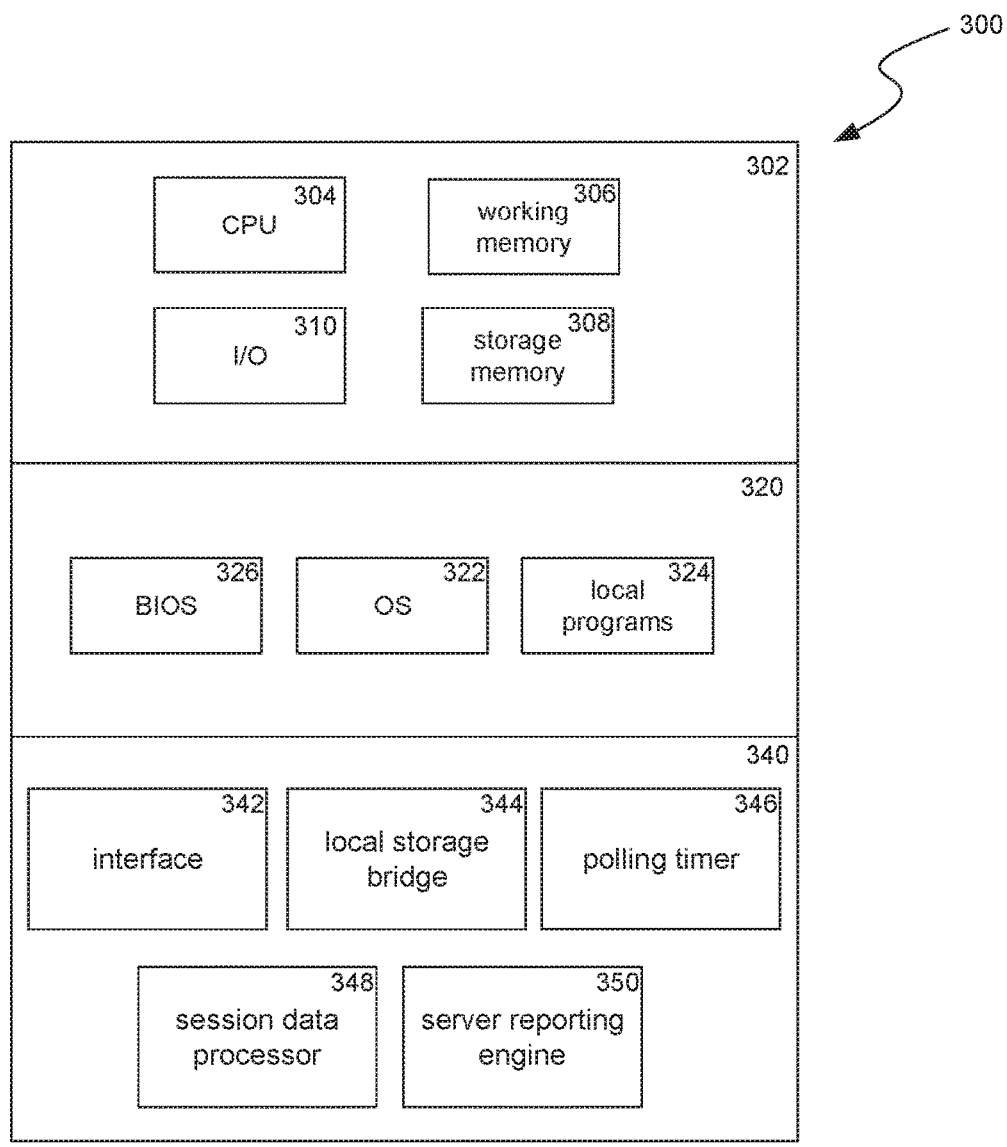
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include local storage bridge 344, polling timer 346, session data processor 348, server reporting engine 350, and components which can be used for transferring data and controlling the specialized components, such as interface 342. In general, all or some of the specialized components 340 can be included in the intersession manager 164 (as shown in FIG. 1).

Local storage bridge 344 can be configured to store, read, write, and otherwise modify data in local storage. In some implementations, the local storage bridge 344 is part of a script (e.g., a script of JAVASCRIPT) in a session, and the script includes instructions and objects for reading and writing data into local memory. Each session can connect to the local storage bridge 344 to write and read data to local storage. The local storage bridge can create a structure for each session in the local storage that stores information about the session. In various implementations, these structures can be organized as discussed below in relation to FIG. 4A or 4B. In various implementations, these structures can include meta-data such as: a session identifier indicating which session that structure is associated with; a "validUntil" parameter indicating how long the data in local storage for that session is valid; a "status" parameter indicating a status of that session such as whether it is active or has been closed, which can also indicate the last time this status was determined; or a "lastUpdated" parameter indicating when was the last time a session wrote out its data structure to the local storage. These parameters are discussed in greater detail below.

Polling timer 346 can be used by each session to determine when that session should update its data about the other sessions by reading the session structures from the local storage. In some implementations, the polling timer 346 for a session periodically (e.g., multiple times per second, once every second, or every twenty seconds) notifies that session that it needs to read data from local storage. A polling timer 346 can be script in JAVASCRIPT. For example, the polling timer can notify the session that every minute, that's session should ask another session if it is still active. As another example, the polling timer can notify the session every two minutes, that the session should compare its data to another session's data.

Session data processor 348 can be configured to receive local storage session data from local storage bridge 344 and use it to perform various actions such as communicating session data to a server using server reporting engine 350, synchronizing data of a current session with the data of other sessions from the local storage; or update, modify, or remove data from a session data structure using local storage bridge 344. In some implementations, the session data processor 348 can determine that the data of one session is not updated compared to the data of another session read from local storage and can subsequently update the data. In some implementations, the session data processor 348 can determine that a value for one entry in one session is different from the value for the same entry in another session. In some implementations, the session data processor 348 can determine that data in a session's data is valid until a certain time (e.g., valid for 2 more hours). Session data processor 348 can determine a session has crashed or is inactive based on, e.g., a status indicator of a session data structure from local storage, by determining that a session is not responding, or by determining that a session has not updated its session data structure in local storage in more than a threshold amount of time.

Server reporting engine 350 can be configured to send session data to a server. In some implementations, the server reporting engine 350 sends data from a crashed session to a server. For example, if the system determines that one tab of a social media web app is not responding, the system can pull the data from local storage data for that session and transmit it to a server using another active session. In some implementations, the server reporting engine 350 sends data from an expired or crashed web app to a server that can include, for example, user data entered to the crashed session or debugging data to indicate what state the crashed session when it last wrote to local storage such as which scripts were executing and where in the scripts execution was at, what data had been entered, etc.

Figure 4A:
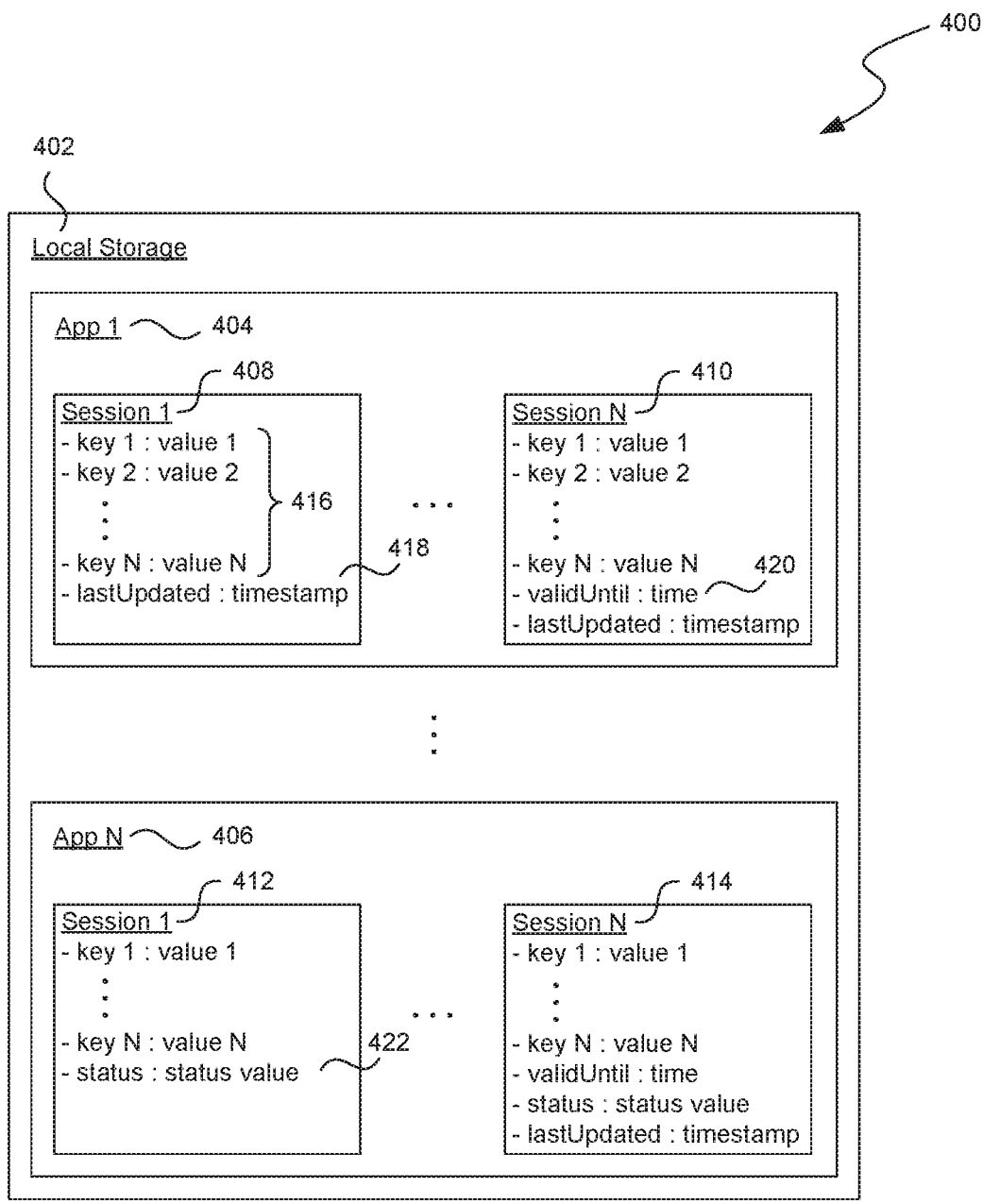
FIG. 4A shows an example implementation where local storage session data is within a per-application structure.

FIG. 4A shows an example 400 implementation where local storage session data is within a per-application structure. As shown in FIG. 4A, session data can be stored in local storage 402 such that the session data for the sessions of each application or website are organized in a container corresponding to the application or website. In example 400, the session data is for a number of applications App 1 404 through App N 406 (e.g., a web app or website). For example, where the serialized version of the data in local storage is stored in an XML style structure, the serialized data corresponding to App 1 can be: <App 1><Session 1>session 1 data</Session 1> . . . <Session N>session N data</Session N></App 1>. Session data can be stored in serialized key-value pair scheme, such as key-value pairs 416 and 418.

In some implementations, some of the key and value pairs can correspond to user data. For example, key1 can be associated with checking a box or selecting an item for placing an item in a shopping cart and value1 can correspond to the item being selected or item being placed in the shopping cart. As another example, key1 can correspond to favorite movie, and value1 can be a user's favorite move in a session. In such an example, a user can change his or her selection of favorite movie in another session. Although the key value would be the same, the value would be different, which can prompt the intersession communication system to update the older value in one of the sessions to the newer one. A more detailed description of how key values can change is described in FIGS. 5-7. In some implementations, some of the key and value pairs can correspond to debugging data, such as a current execution location of a script, a value of a variable, a value or state of a document object model (DOM) element, an action a user is attempting to perform, an identification of received network communications, etc.

In some implementations, the session data structures in local storage 402 can store meta-data for one or more session. In some implementations, a session data structure in local storage includes "lastUpdated" 418 key with a value of timestamp (e.g., 11:11:01 or a number corresponding to a count of seconds since a set time) indicating the last time the session data was changed or when was the last time the session data was written to local storage. In some implementations, the intersession communication system can store multiple lastUpdated values corresponding to individual other key-value pairs indicating when that particular value was last changed. In some implementations, the last updated data value can be used by another session to determine if the data read from local storage is more recent than data known by that session. In some implementations, session meta-data can also include a validUntil key with a time value. For example, a particular session's data can be valid for 10 minutes, and then the data is not valid. An administrator of the system can adjust the validUntil time. In some implementations, the intersession communication system can store multiple validUntil values corresponding to individual other key-value pairs indicating how long that particular value is valid. In some implementations, the meta-data in a session data structure can also include "status" and associated "status values," such as status 422. For example, a status value can correspond to one of: "unresponsive", "active", "inactive", "closed", or "crashed". For example, status of a session can be "closed" or "unresponsive".

As shown in FIG. 4A, local storage can store session data for different applications. For example, "App 1" 404 can be a social media web app or website and "App N" can be a sports website. In such an example, there are 1-N (i.e., n number of) sessions of "App 1" 404 and 1-N sessions of "App N" 406. In some implementations, local storage can store data for each session as a struct (e.g., in JAVASCRIPT).

A session identifier, e.g. "Session 1" 408 (also referred to as a "session ID" or "session token") can be assigned to each session. A session identifier is data that is used to identify a session. For example, a number that is randomly generated and used as a session ID. For example, a buyer who visits a seller's website can collect a number of articles in a virtual shopping cart and then finalize the shopping by selecting to go to the website's checkout page. This typically involves an ongoing communication where several webpages (i.e., sessions) are open. In such a situation, a session ID for each session can be used to distinguish between sessions.

Figure 4B:
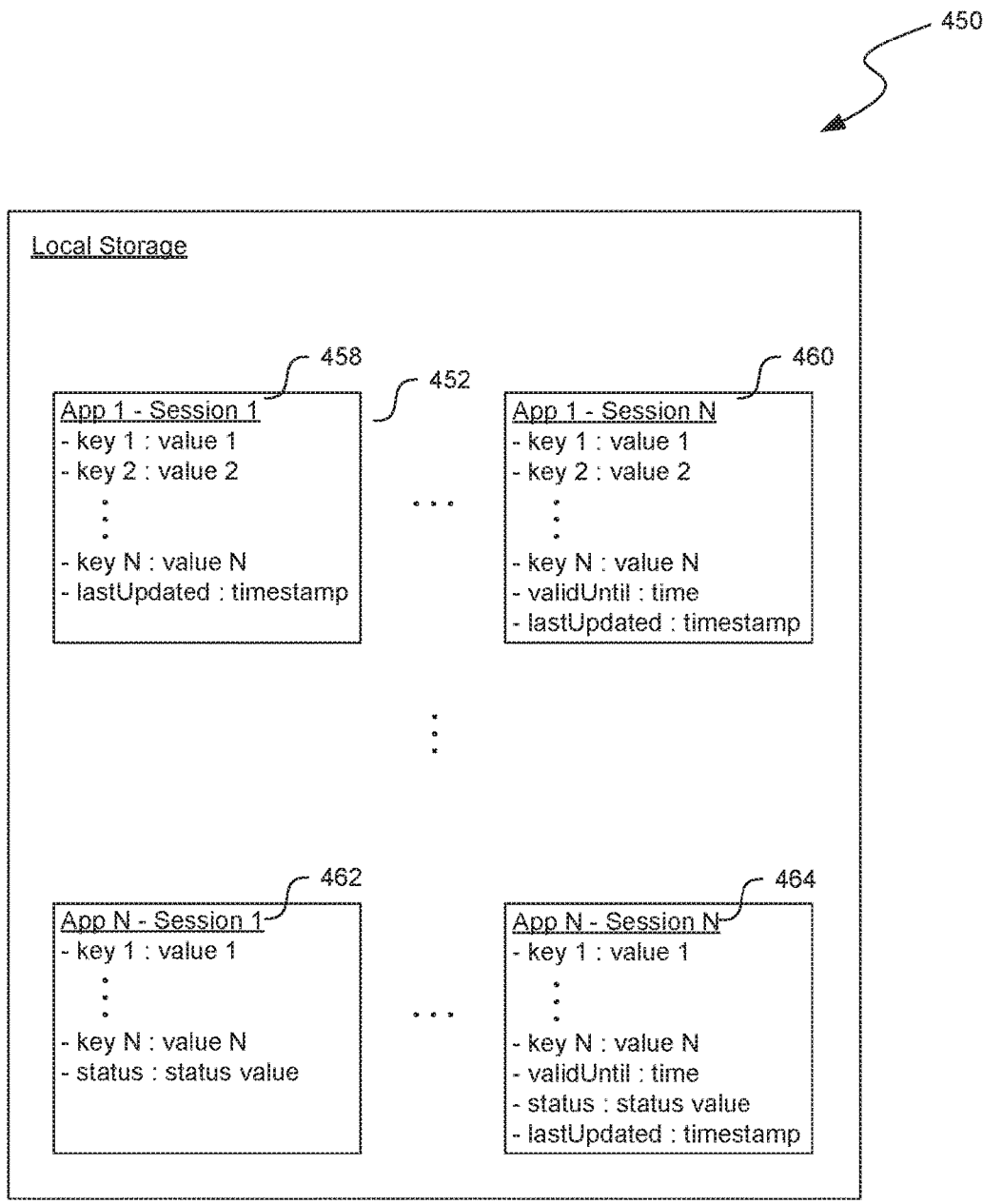
FIG. 4B shows an example implementation where local storage session data uses concatenations of application and session identifiers to structure data.

FIG. 4B shows an example 450 implementation where local storage session data uses concatenations of application and session identifiers to structure data. In example 450, session data structures can be stored and read directly to local storage without accessing other session data structures. This data organization allows individual session data structures to be read and written to local storage. This is as compared to example 400, where all the session data structures for a website would be read or stored at once. In example 450, the session data structures can be accessed using the session data structure identifiers 458-464. For example, session structure 452 can be accessed through a javascript call to window.localStorage.getItem("App 1-Session 1"). Where the serialized version of the data in local storage is stored in an XML style structure, the serialized data for the sessions of App 1 can be: <App 1-Session 1>session 1 data</Session 1> . . . <App 1-Session N>session N data</Session N>.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the the components described above can execute one or more of the processes described below.

Figure 5:
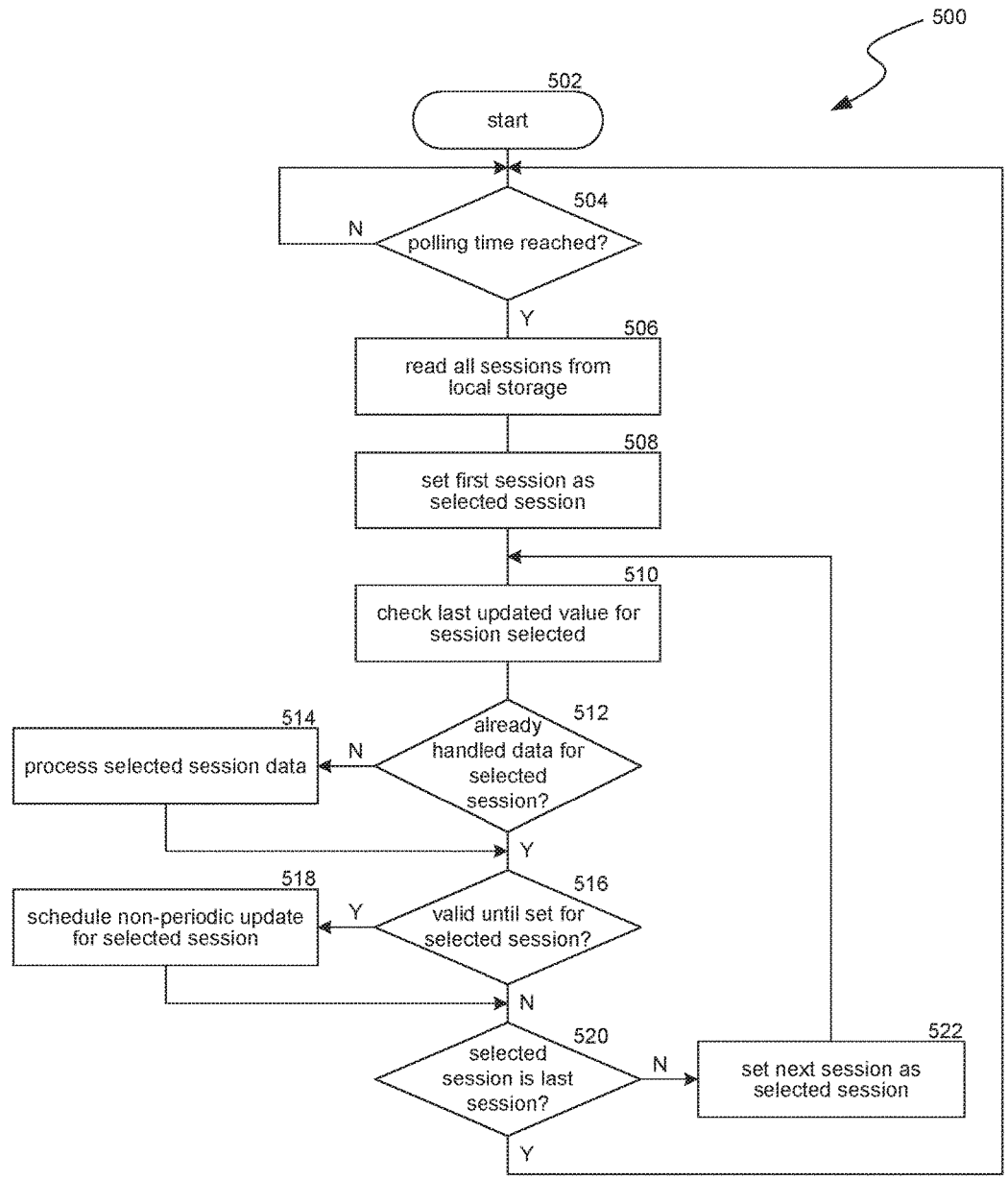
FIG. 5 is a flow diagram illustrating a process used in some implementations for a session to poll and handle data from other sessions.

FIG. 5 is a flow diagram illustrating a process 500 used in some implementations for a session to poll and handle data from other sessions. Process 500 begins at block 502 and continues to block 504. Process 500 can be performed by each of multiple sessions of an application executing within a browser. In some implementations, a separate operating thread can be used by each session to perform a version of process 500. For example, multiple tabs in the browser can be open to the same social media website. At decision block 504, process 500 can determine whether a polling time has been reached. Process 500 can use the polling timer to determine how often the session should read the session data structures from the local storage. If the polling time has not been reached, process 500 waits a period of time before computing whether the polling time has been reached (e.g., waits until the poll timer indicates it is time to poll another session). If the polling time has been reached, process 500 proceeds to block 506. In general, polling time can be set to one of various lengths such as a portion of a second, multiple seconds, minutes, or hours.

At block 506, process 500 reads the session data structures from local storage. In some implementations, process 500 reads the data stored in local storage by iterating through the sessions. In some implementations, process 500 reads all sessions from local storage for a particular website or web app application. In some implementations, when polling time has been reached, the system can begin to read all sessions from local storage for a social media web app. All the data structure stored in local storage for session of that social media app will be read. For example, if a user opened four tabs for a social media website and the user has made selections and changes to one tab of that social media website, process 500 executed by another tab can read data from all the other sessions of the website in the local memory when its polling time has been reached.

At block 508, process 500 can set a first session data structure as a selected session structure. In some implementations, the first session that is set as the selected session structure can be the most recently updated session. For example, process 500 can determine the user mostly updated one tab of social media web app, and set that session as the selected session structure. In some implementations, process 500 can select the first session structure randomly.

At block 510, process 500 checks the last updated value (e.g. "lastUpdated") for the selected structure to determine if the data from this session has already been handled, e.g. whether the session executing process 500 has received data since the last update that could conflict with the current sessions data or data from the selected session structure has already been reported to a server. For example, process 500 can read from local data that the selected session structure was updated one 15 minutes ago and can determine that because the polling time is every 1 minute, process 500 does not need to operate on the selected data structure because it will have processed that data in a previous execution. As another example, process 500 can determine that the session corresponding to the selected session structure has crashed but that a crash report has already been sent to a server.

At decision block 512, process 500 determines whether data is already handled for the selected session structure. If process 500 determines that it has not already handled data for the selected session structure, then process 500 proceeds to block 514. For example, process 500 can determine that the selected session was updated 10 minutes ago and another session has data that was updated 8 minutes ago. In this example, process 500 can determine the different in data between the sessions to determine if one session needs to be updated. If process 500 determines that it has already handled data for a selected session, process 500 proceeds to decision block 516.

At block 514, process 500 can process the selected session structure data. In some implementations, process 500 can cleanup or remove data from one session. For example, if a social media web app has two values for a selection in one tab, and two different values for the same social media web app in another session, process 500 can determine which values the more recent and modify the session data to be updated. Process 500 can determine if data from the selected session structure should be sent to a server, such as if the session corresponding to the selected session structure has crashed or if only one session is tasked with providing all the data for an application to a server. These types of processing are described in more detail in relation to FIG. 6. Also, process 500 can determine if another session has ended and the selected session structure should be removed from the local storage, which is described in more detail in relation to FIG. 7. In various implementations, process 500 can determine if a session crashed, if session is not up to date, or if a session has different data than another session.

At decision block 516, process 500 can determine if the data in the selected session structure is valid until a particular time. If so, process 500 continues to block 518. For example, process 500 can read a validUntil value from session data and determines that the data is valid for another two minutes. At block 518, process 500 can schedule non-periodic updates for the selected session structure. For example, if the next polling time is in 10 min, but the data in a session structure expires in two minutes, then a non-periodic update (e.g. execution of block 514) can be scheduled to occur when the session structure expires instead of waiting for the next polling timer to expire. If a session does not have a validUntil time set or the validUntil time is set for a time in the future later than the next polling time, process 500 continues to decision block 520. In some implementations, the check at process 516 and 518 are not performed and instead session structures are checked at polling time intervals.

At decision block 520, process 500 determines whether the selected session structure is the last session from the local storage. If process 500 determines that a selected session is the last session, process 500 returns to decision block 504. For example, if process 500 has processed and updated all the session data for each session for a web app, then the session returns to decision block 504. As another example, if process 500 determines that a selected session is not the last session, then process 500 sets next session as selected session at block 522, and process 500 returns to decision block 510. For example, if process 500 determines that there are four tabs open for a social media web application, and process 500 has updated the data for all tabs, then process 500 has updated the last session. Process 500 can repeat process 500 when the polling time is reached again. In some implementations, process 500 continues to execute until the session executing it ends.

Figure 6:
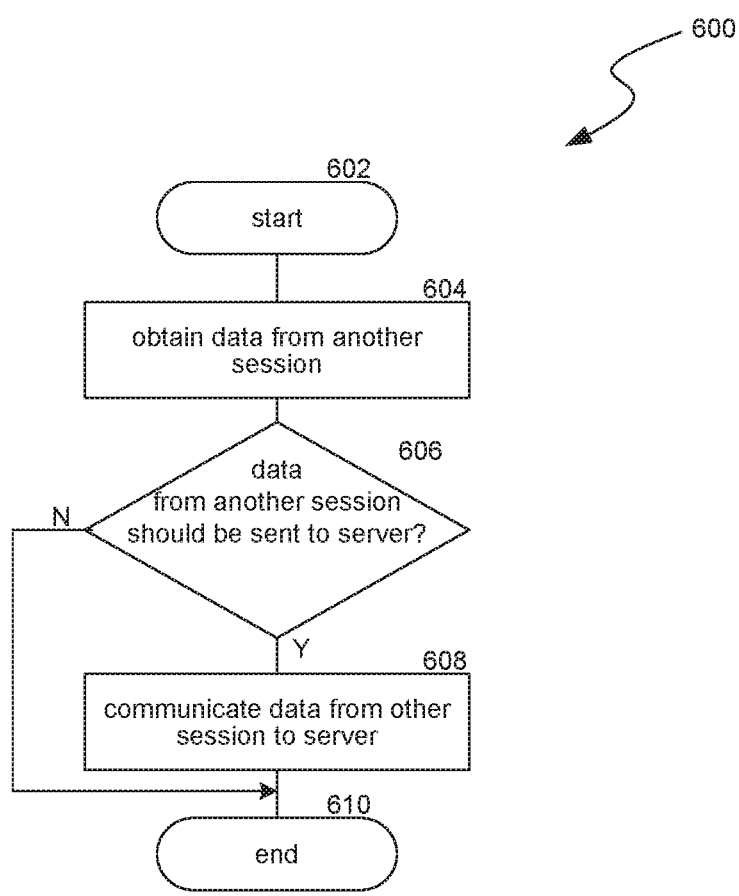
FIG. 6 is a flow diagram illustrating a process used in some implementations for a first session to obtain and report data from another session.

FIG. 6 is a flow diagram illustrating a process 600 used in some implementations for a first session to obtain and report data from another session. Process 600 begins at block 602 and continues to block 604. In some implementations, process 600 can be called by process 500 at block 514. At block 604, process 600 can obtain data from the other session. For example, where process 600 was called by block 514, the obtained session data can be the currently selected session structure selected at block 508 or 522.

At decision block 606, process 600 determines whether data from another session should be sent to a server. If process 600 determines that data from another session should be sent to server, process 600 proceeds to block 608. If process 600 determines that data from another session should not be sent to a server, then process 600 proceeds to step 610, where it ends. In various implementations, process 600 can determine that data should be send to a server A) when there is an inconsistency between session data and only one session should report the data, B) when the session executing process 600 is a primary reporting session for an application and another session needs to send data to a server, or C) when it determines that the other session has crashed.

As an example of reporting an inconsistency between sessions, a key for selecting to read an email may have a value of unread in one session, but the same key may have a value of read in the session structure of local storage for another session. In this case, it is likely that the user read the email in another session but that session failed to update the server and process 600 needs to send an update to a server to indicate the change.

As an example of one session being a primary reporting session for an application and reporting data from another session of the application to a server can include one session, such as the first session opened for an application, being established as the reporting session. When another session of the application needs to send information to a server, it can add the information to its session structure in local storage and mark it for being sent to the server. The primary reporting session can read that session structure and can send the information to the server based on the marking.

As an example of one session reporting data from another session that has stopped responding or crashed can include the current session determining that the session corresponding to the session data received at block 604 has crashed and that the crash was not reported to a server. In some implementations, process 600 can determine that one session has crashed by one or more of: determining that a session is no longer active but was not marked closed, that the last update by that session of its session structure in the local storage was longer than a threshold amount of time together (e.g. each session is expected to write its session structure at least once every five seconds and a structure hasn't been updated in over 15 seconds), or the other session is not responding to queries. Data reported to the server from a crashed session can include data that was written to local storage by that session before it crashed, for example, user entered data or a status of the crashed session such as what code was executing, at what execution point, and with what variable data when that session last wrote its session structure to local storage. In some implementations, the data reported to the server from a crashed session can include additional data gathered by the reporting session. For example, the browser can have stored information about what was occurring in the crashed session that can be retrieved and included in the crash report. As another example, memory allocated for or used by the crashed session may have been saved or may not have yet been written over and the contents of this memory can be included in the crash report.

At block 608, process 600 can communicate data identified at block 606 from the other sessions to a server. Process 600 can then continue to block 610, where it ends.

Figure 7:
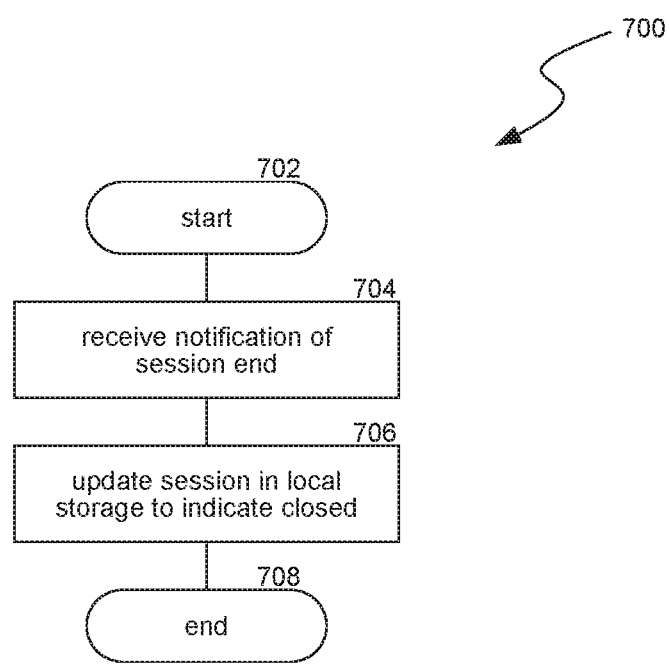
FIG. 7 is a flow diagram illustrating a process used in some implementations for maintaining local storage.

FIG. 7 is a flow diagram illustrating a process 700 used in some implementations for maintaining local storage. Process 700 begins at block 702 and continues to block 704. In some implementations, process 700 can be initiated at block 514 of process 500. Process 700 can be performed, e.g., to cleanup local storage when one tab of a website is closed and other tabs for the website are still open.

At block 704, process 700 can receive a notification of a session ending. For example, a user can close a social media website or logout of an email web app in one tab. In some implementations, process 700 be performed for each session of an application when the application or web browser running the application is closed. Alternatively, process 700 can receive information that one session has closed, and store this information in local storage. For example, a user can close a shopping web app, and the user's shopping cart selections can be saved.

At block 706, process 700 can update a session structure in local storage to indicate it is closed either by removing the session from local storage, modifying the meta-data status field of that session's structure in local storage to indicate the session is closed; or set a timer or other indicator for future removal of the session structure. For example, in some implementations, the system can determine that a session has been closed and delete the corresponding data in local storage. Alternatively, process 700 can determine a session is closed and keep the session data for a period of time (e.g., one minute or one day) to allow other sessions to operate on the data, e.g., by synchronizing the data between sessions or reporting it to a server. In some implementations, the period of time can correspond to a multiple of the polling timer used at block 504 to allow the other sessions to read the session structure before it is removed from local storage. In some implementations, the period of time can be set based on a determination of how long data in the session structure is likely to be relevant or based on when the validUntil field for that session structure expires. Then, process 700 proceeds to block 708, where it ends.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for inter-session communication between multiple browser sessions, comprising:
    storing, in local storage of a browser, structured data sets for each of multiple sessions of a browser-based application, wherein at least one chosen structured data set of the structured data sets comprises:
        an application identifier indicating the browser-based application;
        a session identifier indicating a session associated with the chosen structured data set;
        a timestamp indicating when the chosen structured data set was last updated;
        a valid until time marker indicating when data in the chosen structured data set is valid until; and
        a status identifier indicating whether the session associated with the chosen structured data set is active;
    reading, by a current session of the multiple browser sessions, multiple of the structured data sets from the local storage of the browser; and
    for a selected structured data set of the multiple structured data sets:
        determining that the selected structured data set includes one or more data items that need to be processed by the current session based at least on the one or more data items having different data than corresponding one or more data items of the current session; and
        in response to the determining, processing the one or more data items, wherein processing the one or more data items comprises updating, in the local storage of the browser, the one or more data items having an older timestamp with the one or more data items having a more recent timestamp.

2. The method of claim 1,
    wherein the determining that the selected session data structure includes one or more data items that need to be processed comprises determining that no other session has previously sent the portion of the selected session data structure to a server; and
    wherein the processing the one or more data items comprises sending at least a portion of the selected session data structure to the server.

3. The method of claim 1,
    wherein the current session is configured to report, to a server, data from a second session that is associated with the selected session data structure;
    wherein at least one data item in the selected session data structure was flagged by the second session for reporting to a server; and
    wherein the processing the one or more data items comprises sending the at least one data item to the server.

4. The method of claim 1, wherein the current session reads a set of session data structures from the local storage on a periodic basis.

5. The method of claim 4, further comprising:
    determining that the selected structured data set has a valid until value indicating when data in the selected structured data set is valid until; and
    scheduling an updated reading of the local storage of the browser at a time other than on the periodic basis, wherein the time for the updated reading of the local storage of the browser is based on the valid until value of the selected structured data set.

6. The method of claim 1 wherein determining that the selected structured data set includes one or more data items that need to be processed by the current session comprises identifying that a browser session associated with the selected structured data set has crashed.

7. The method of claim 6 wherein identifying that the browser session associated with the selected structured data set has crashed comprises one or more of:
    determining that the browser session is no longer active and that the selected structured data set has not been marked as closed;
    determining that a timestamp indicating when the selected session data structure was last updated is older than a threshold from a current time;
    determining that the second browser session is not responding; or
    any combination thereof.

8. The method of claim 6 wherein processing the one or more data items comprises:
    removing the selected structured data set from the local storage of the browser; or
    setting a status identifier associated with the selected structured data set to indicate that the browser session associated with the selected structured data set is not active.

9. A system for intersession communication between multiple browser sessions, comprising:
    a polling timer configured to trigger a local storage read event upon termination of a timer, wherein the timer was initiated based on a previous read event;
    a local storage bridge configured to read multiple session data structures from a local storage memory of a browser; and
    a session data processor configured to, for a selected session data structure of the multiple session data structures:
        determine that the selected session data structure includes one or more data items that have not previously been synchronized with corresponding data entered by a user to a current session of the multiple browser sessions; and
        in response to the determining, synchronize the one or more data items with the corresponding data entered by the user to the current session by updating, in the local storage memory of the browser, the one or more data items with the corresponding data entered by the user to the current session.

10. The system of claim 9 wherein the selected session data structure comprises:
    an application identifier indicating a browser-based application which initialized the second browser session; and
    a session identifier for the second browser session.

11. The system of claim 9 wherein the selected session data structure comprises a timestamp indicating when the selected session data structure was last updated.

12. The system of claim 9 wherein the selected session data structure comprises a valid until time marker indicating when data in the selected session data structure is valid until.

13. The system of claim 9 wherein the selected session data structure comprises a status identifier indicating whether the second browser session is active.

\* \* \* \* \*